Oct. 30, 1962 W. AUERSWALD ET AL 3,061,518
METHOD FOR THE FILTRATION OF VIRUS FLUIDS
Filed July 10, 1959
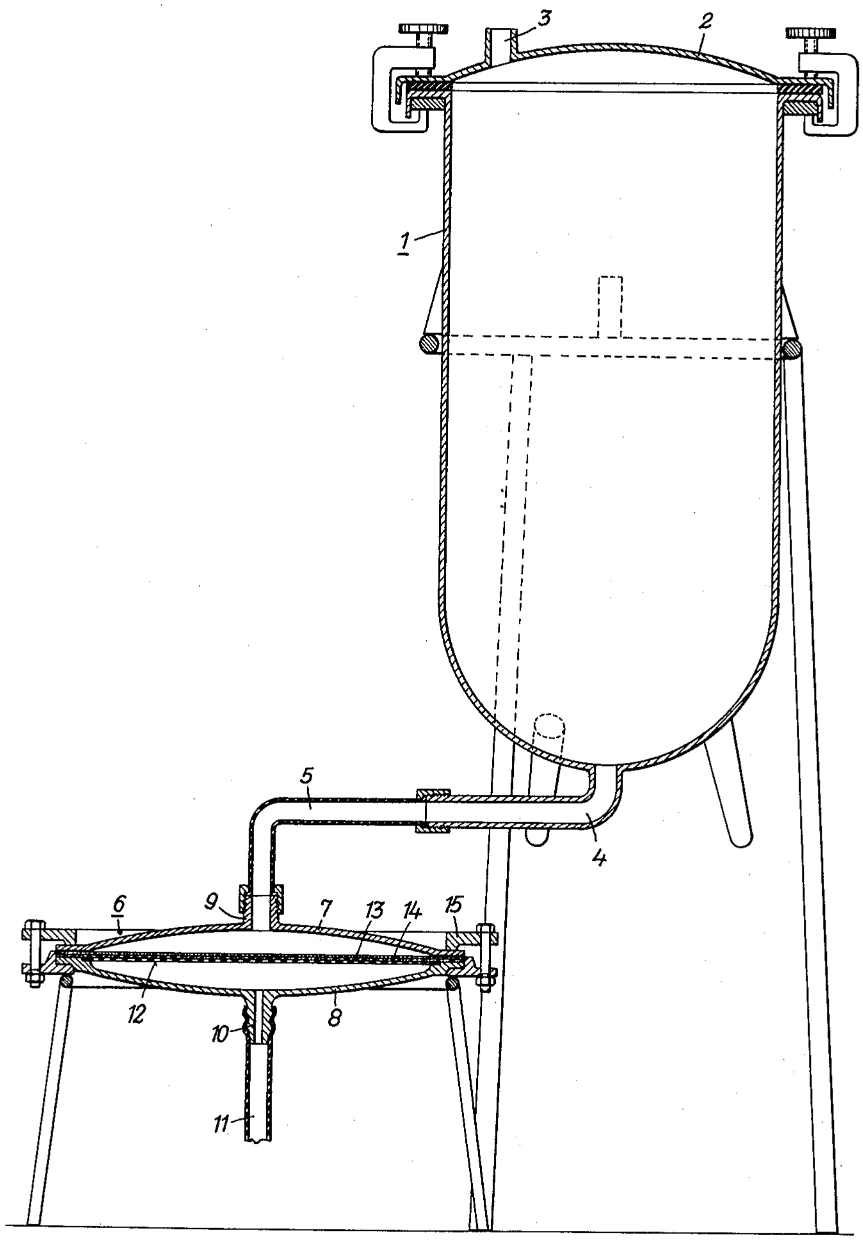
INVENTORS
W. Auerswald
J. Eibl
BY Glascock Downing & Seebold
ATTYS.

3,061,518

METHOD FOR THE FILTRATION OF VIRUS FLUIDS

Wilhelm Auerswald, 22 Wahringer Strasse, Vienna IX, Austria, and Johann Eibl, 1 Wohllebengasse, Vienna IV, Austria Filed July 10, 1959, Ser. No. 826,268
Claims priority, application Austria July 2, 1959
5 Claims. (Cl. 167—78)

This invention relates to a method for the filtration of virus fluids; in particular the invention relates to the elimination of the antigen-adsorption activity of pore filters destined for the filtration of virus fluids.

The filtration of virus suspensions is a crucial step in processing virus suspensions for vaccine production. For instance in the production of poliomyelitis vaccine by infecting tissue cultures with the virus, multiplication of the virus occurs and finally the culture fluid contains high concentrations of virus. In order to get this virus suspension free from bacteria, aggregates and minute parts of destructed cells, filtration through pore filters, so-called bacteria tight filters is necessary (Regulations of Biological Products, revised August 1956, U.S. Department of Health, Education and Welfare §§73 100–73 105). Such a filtration, however, always involves a significant loss of antigenicity that can be demonstrated by titration according to the tissue culture technique. This means that while obtaining a filtrate which is free from concomitant bacteria and aggregates an undesirable loss of the antigenic value of the virus suspension occurs. The reason for these losses during filtration is the high adsorptive capacity of the inner surfaces of the filter pads or pores.

Several attempts have been made to decrease the loss of antigenicity during filtration. First of all, attention has been given to the filter materials and it has been found that filter pads of the cellulose type, such as Schleicher and Schuell membrane filters, are suitable, whereas asbestos filters must be excluded from virus filtration due to their extraordinary high adsorptive power. Furthermore it has been proposed to pretreat the filter pads before filtering the virus suspension with gelatine or high polypeptides. But these materials whose appearance in the final vaccine cannot be fully avoided, involve certain risks for the vaccinees. According to the common vaccination schedules, virus vaccines must be injected parenterally repeatedly. The materials mentioned hereinbefore may sensitize a vaccinee and induce allergic reactions.

The main object of the present invention is to avoid these difficulties and to provide a safe virus vaccine free from bacteria, aggregates and other undesirable contents and having a high level of antigenicity.

A further object of the invention is to eliminate the loss of antigenicity in a given virus suspension during filtration by saturating the adsorptive capacity of the filter pores or of the active inner surfaces of the filter pads.

According to the invention a pore filter destined for the filtration of virus fluids is treated with a human protein solution which had been previously subjected to an inactivation procedure in order to avoid any risk of transmitting active virus of the homologous hepatitis serum into the filtrate by said human protein solution. The inactivated protein solution from human origin must also be free from denatured protein fractions which could act as new antigens, and must not contain proteins which could give virus neutralizing effects. It has been found that all requirements are optionally fulfilled when proteins from human origin are used having an electrophoretic mobility of the classes between $-8.0$ and $-3.0 \times 10^{-5}$ cm.$^2$ volt$^{-1}$ sec.$^{-1}$ and being stable during a 10 hours' heat treatment at a temperature of about 60° C. after which treatment their turbidity is not more than 30 Mueller units.

It is understood by one skilled in the art that the determination of the electrophoretic mobility is effected in a barbiturate buffer solution at a pH value of 8.6 and the turbidity is measured in a 5 percent solution. According to the definition of a Mueller unit, one unit measured in the Mueller nephelometer at 5461 Angstrom units corresponds to 0.0010 cm.$^{-1}$ absolute turbidity.

Examples of human proteins which may successfully be used in the process according to the invention are the P.P.F. human plasma protein fraction and the human albumin. The P.P.F. human plasma protein fraction is that produced in accordance with the provisional minimum requirements of the U.S. Department of Health, Education and Welfare, Public Health Service, National Institutes of Health, Bethesda 14, Maryland, of August 14, 1958, certain of which are as follows:

"(1) *Proper name and definition.*—The proper name of this product shall be Plasma Protein Fraction (Human) and it is defined as a product derived from human blood consisting of not less than 85±2.7 globulins other than gamma globulin by moving boundary electrophoresis.

"(2) *Source.*—Plasma Protein Fraction (Human) is made from human plasma containing not more than 25 mg. of hemoglobin per 100 ml. Donors of the plasma shall be in good health and free of disease transmissible by heat treated blood fractions as determined by medical history and such physical examination as appears necessary at the time of blood collection. No individual shall be used as a source of Plasma Protein Fraction (Human) if he has "(*a*) A history of viral hepatitis;
"(*b*) A history of close contact within six months of donation with an individual having viral hepatitis;
"(*c*) A history of having received within six months human blood, or any derivative of human blood which the Division of Biologics Standards has advised the licensed establishment is a possible source of hepatitis.

"(3) *Processing method.*—The processing method shall be one that uniformly yields a protein mixture which does not show more than a 5% apparent increase in alpha globulin (T-globulin) after heating at 60° for ten hours; which contains less than 1.7 gamma globulin as measured by the electrophoretic method described herein and which contains less than 5% of protein with a sedimentation constant of over 7.0. The processing method shall yield a product which is safe and suitable for intravenous injection. The various steps in processing shall be conducted in as aseptic a manner as possible and every precaution of technique and cleanliness of equipment must be observed to prevent unnecessary contamination either with bacteria or other deleterious matter—particularly pyrogenic material. A preservative or bacteriostatic agent shall not be used to prevent bacterial growth during processing.

"(4) *Other processing.*—As soon as possible after removing the other components of plasma from Plasma Protein Fraction, making electrolyte and pH adjustments, and adding the stabilizer, it shall be filtered to sterilize and remove particulate matter. The entire contents of each bulk container shall be filled into final containers during a single filling operation. If issued as a liquid the product shall be heated in the final container at an attained temperature of 60° C. for not less than 10 hours and all final containers shall be held at 18 to 35° C. for not less than 7 days and examined for visible evidence of bacterial growth. If issued as a dried product, Plasma Protein Fraction (Human) shall be heated as above before drying.

"(5) *Control tests on the product.*—Each lot of Plasma Protein Fraction (human) shall pass the following tests:

"(*a*) *Sterility.*—Plasma Protein Fraction (Human) in final containers shall pass the tests for sterility.

"(*b*) *Stability test.*—The turbidity is measured by comparison of the light of wave length 5461 A. (from a General Electric H4 mercury vapor lamp through a Corning No. 3486 filter) scattered at an angle of 45° and that transmitted at 0°. One unit of the Mueller nephelometer as currently used corresponds to 0.0010–1 absolute turbidity. Plasma Protein Fraction (Human) shall meet the following criteria: (1) The turbidity of the 5% Plasma Protein Fraction (Human) solution after heat treatment must not be more than 30 units. (2) The turbidity must not increase more than 25 units when the sample is heated for 50 hours at 57° C. and after agitation in a mechanical shaker for 6 hours.

"(*c*) The final product, if a liquid, shall contain 5±0.25% of protein from human plasma and if dried shall be accompanied by diluent to reconstitute to this protein concentration.

"(*d*) *Safety test.*—Plasma Protein Fraction (Human) shall pass the test for safety.

"(*e*) *Pyrogen test.*—Plasma Protein Fraction (Human) shall not cause a temperature rise of 1.1° C. or more in rabbits when injected in an amount of 3.0 ml. per kilo of rabbit weight.

"(*f*) *Sodium and potassium content.*—The sodium concentration shall not exceed 0.15±0.01 M. The potassium concentration shall not exceed 0.001 M. The flame photometer is considered adequate for these tests.

"(*g*) *pH.*—The pH of the final product is 7±0.3 as measured in a solution diluted to 1 percent protein in 0.15 M. NaCl."

The human albumin is that produced in accordance with the minimum requirements for human albumin of the U.S. Department of Health, Education, and Welfare, Public Health Service, National Institutes of Health, Bethesda 14, Maryland, 8th revision, July 30, 1953, certain of which are as follows.

"Normal Serum Albumin (Human):

"1. The product—

"1.1 *Proper name.*—The proper name is Normal Serum Albumin (Human).

"1.2 *Definition.*—Normal Serum Albumin (Human) is a sterile preparation of the serum albumin component of human blood.

"1.3 *Source.*—Normal Serum Albumin (Human) is prepared from human blood collected in one of the anticoagulants described in section 2.2.

"1.31. Determination of the suitability of the donor shall be the responsibility of a licensed physician and shall be made by him or under his supervision with the assistance of the necessary trained attendants. Only those persons may serve as a source of blood who are in physical condition to give blood, whose temperature and blood pressure are normal and who are free of disease transmissible by blood products as far as can be determined from the donor's history and from such physical examination and clinical tests as appear necessary for each donor on the day the blood is obtained.

"4. Method of processing—

"4.1 *Plasma acceptable for processing.*—Normal serum albumin shall be processed only from plasma containing not more than 100 mg. hemoglobin per 100 ml. and prepared as indicated in section 3, or from Normal Human Plasma prepared in accordance with the Minimum Requirements for that product.

"4.2. *Separation of the albumin fraction.*—Only those methods of processing which have been demonstrated to be capable of producing a final product free of the agent(s) of viral hepatitis will be considered satisfactory. In addition, the processing method shall yield a product which will be safe and suitable for intravenous injection. The various steps in processing shall be conducted in as aseptic a manner as possible, and every precaution of technique and cleanliness of equipment must be observed to prevent unnecessary contamination either with bacteria or other deleterious matter—particularly pyrogenic material.

"4.52. Accepted stabilizers for Normal Serum Albumin (Human) are:

"(*a*) 0.04 M. sodium acetyltryptophanate

"(*b*) 0.02 M. sodium acetyltryptophanate and 0.02 M. sodium caprylate

"4.53. The pH of the final product is 6.9±0.4 as measured in a solution diluted to 1 percent in 0.15 M. NaCl.

"4.54. The solution shall be rendered bacteriologically sterile by filtration through a bacteria-excluding filter promptly after dissolving in the diluent.

"4.7. *Heat treatment.*—Regardless of whether the final product is liquid or dried the albumin is heated during processing as a 25 percent solution at an attained temperature of 60° C.±0.5° C. for not less than 10 hours.

"4.8. *Inspection of final containers of liquid albumin following heating.*—All final containers of liquid albumin shall be held for not less than 7 days at 18–35° C. At the end of this incubation period the containers are inspected and any showing visible evidence of bacterial growth shall be discarded.

"5. Control tests on the product—

"5.1. Sterility test.

"5.2. *Stability test.*—The turbidity is measured by comparison of the light of wave length 5461 A. (from a General Electric H4 mercury vapor lamp through a Corning No. 3486 filter) scattered at an angle of 45° and that transmitted at 0°. One unit of the Mueller nephelometer as currently used corresponds to 0.0010 $cm.^{-1}$ absolute turbidity. The albumin shall meet the following criteria:

"(*a*) The turbidity of the 25 percent albumin solution after heat treatment must not be more than 16 units (preferably not more than 15 units). It must not increase more than 5 units during 12 days at 50° C. (preferably not more than 3 units).

"(*b*) The turbidity must not increase more than 21 units (preferably not more than 20 units) when the sample is heated for 50 hours at 57° C.

"(*c*) The solution shall be substantially free from visible particles, both before heating and after 12 days at 50° C.

"5.3. *Concentration of protein.*—The amount of protein present shall be determined by a Kjeldahl N method on the basis of total $N \times 6.25$ (corrected for the Kjeldahl nitrogen content of stabilizer) and the composition of the proteins shall be determined by electrophoretic analysis.

"5.4. *Albumin and globulin content.*—The total proteins in the final product shall consist of not more than 3 percent of globulins as estimated electrophoretically in barbiturate buffer of ionic strength 0.1 and pH 8.6.

"5.5. *Safety test.*—A safety test shall be made on the contents of a final container selected at random from each filling of a lot. The parenteral injection of 0.5 ml. into each of 2 mice weighing approximately 20 grams and 5.0 ml. into each of 2 guinea pigs weighing approximately 350 grams shall cause neither significant symptoms nor death within 7 days.

"5.6. *Pyrogen test.*—A pyrogen test is made on the contents of a final container selected at random from each filling of a lot. The test is performed as described in the Memorandum of Details, except that the product is acceptable if the temperature rise is less than 1.1° C. (2.0° F.) on each of three hourly readings in each of three rabbits following the intravenous injection of 3.0 ml. per kilo of rabbit weight. The test provides for a retest.

"5.9. *Sodium content.*—The final preparation must contain not more than 0.014 gm. of sodium per gram of albumin (preferably not more than 0.013 gm.).

"5.10. *Heme content.*—The optical extinction at 403 mh. of a 1% albumin solution in a 1 cm. cell $$(E^{1\%}_{1\,cm.}\ (403\ m\mu))$$

shall not exceed 0.25, which corresponds approximately to 4.6 mg. heme per 25 grams of albumin, with the understanding that this limit will be reduced as soon as improved methods of blood collection and processing make this possible."

These proteins may be used in a 3 to 4 percent solution. The total amount of the protein solution used for treating the filter should be in a certain relation to the filter area; it has been found that satisfactory results are obtained when such an amount is used that 50–55 mg. protein per square centimeter of the filter pad are available.

After having treated the pore filter with the human protein solution in order to saturate the active inner surfaces of the pores, the protein material not tightly adsorbed must be cautiously removed. For this purpose the filter is washed with sterile saline or with sterile Hank's solution until the last washing shows not more than traces of protein. While the presence of traces of human proteins in the filtrate is unobjectionable it must be considered that proteins present in higher concentrations have disturbing effects in the subsequent processing of the virus suspensions by interaction with inactivating agents or in the administering of the vaccines by inducing allergic reactions in vaccinees.

With the aid of the process according to the invention it is possible to retain the antigenicity of virus fluids subjected to filtration on the high origin level before the filtration step.

The process according to the invention is applicable of virus of several kinds. The process has been adopted with particular success for the treating of poliomyelitis virus of the types I, II and III.

Filter materials which have been found to be most suitable for the process according to the invention are the cellulose type filter and in particular the acetyl cellulose type filter. The mean pore dimensions of the filter pads should be in certain relation to the mean particle diameters of the virus e.g. in a relation of 3:1 to 10:1.

A filtration set suitable for using in the process according to the invention is shown in the accompanying drawing which represents a sectional view.

The filtration set comprises a pressure tight container 1 having a screw cap 2 with an inlet 3 for compressed air. In the bottom of the container an outlet 4 is provided connected with the tube 5 leading to the filter drum 6. The filter drum is formed by two concave bottoms 7 and 8 each having a fitting 9 and 10 for the connection with the tube 5 for supplying the fluid to be filtrated and the tube 11 for removing the filtrate. The filter elements consisting of a stainless steel rack 12, a paper filter pad 14 (for instance Seitz No. 68) and an acetyl cellulose type filter 13 are tightened between the edges of the bottoms 7 and 8 by means of the tightening elements 15.

The invention is illustrated in greater detail by the following examples:

*Example 1*

A bacteria tight filter pad of the acetyl cellulose type having a mean pore diameter of about 1000 Angstrom units was introduced into the pressure filtration set as shown in the drawing. The filter pad (diameter 300 mm.) was boiled in distilled water during 30 minutes. Then the pad was placed on a paper filter of the Seitz type (No. 68) and both were put on the stainless steel rack of the filter set. The upper and lower bottoms of the drum were pressure tight closed. The filtration set was steam sterilized before use.

The filtration set was connected by sterilized tubing under sterile conditions to a container having a volume of 20 litres. A solution containing a human plasma protein fraction (P.P.F. protein produced according to the provisional Minimum Requirements of the National Institutes of Health and thus a product derived from human blood consisting of not less than ±2.7 albumin and not more than 15± globulins other than gamma globulin by moving boundary electrophoresis) in a concentration of 3.5 weight/volume percent was subjected to heat treatment during a period of 10 hours at 60° C. The turbidity of the heat treated solution was not higher than 30 Mueller units; the solution was clarified by filtration. As per one square centimeter of acetyl cellulose pad not more than 1.3 millilitres of the solution are necessary, a total amount of 910 millilitres of the 3.5 percent P.P.F.-solution are necessary to treat the filter pad. This volume was passed under pressure through the acetyl cellulose pad. Then 15 litres of Hank's solution (21.5 millilitres per square centimeter) were passed through the filter in order to remove all loosely adsorbed protein material. The last filtrate of the washing was tested with trichloro acetic acid to determine absence of protein. If more than traces of protein were detectable, additional washing with Hank's solution was necessary. The filtration set was disconnected from the 20 litre container and attached to a 50 litre container for filtering virus suspension through the prepared filter. In three consecutive operations 50 litres each of virus suspensions of poliomyelitis of type I (strain Mahoney), type II (strain MEF–1), and type III (strain Saukett) were clarified by filtration through Seitz type filter pads No. 68 and then passed through the protein saturated acetyl cellulose filter pad under a pressure of 1.5 atmospheres. Samples were taken before and after the filtration for titration of the virus. A comparison of the two samples according to the tissue culture technique, the values being given in logs of 10 indicating the dilution at which 50 percent of the tissue cultures showed a cytopathogenic effect, gave the following results:

| type of virus | before filtration titre per 0.25 ml., double estimations | after filtration titre per 0.25 ml., double estimations |
|---|---|---|
| I | 6.5<br>6.9 | 6.3<br>6.8 |
| II | 6.1<br>7.0 | 6.3<br>6.8 |
| III | 6.8<br>6.5 | 6.8<br>6.3 |

It is seen that in none of the three virus suspensions significant losses of antigenicity could be detected.

*Example 2*

The filtration set was prepared as described in Example 1. A solution containing 4 weight/volume percent of human albumin (produced according to the Minimum Requirements of the National Institutes of Health for Human Albumin and thus a sterile preparation of the serum albumin component of human blood comprising the final product, the total protein content of which consists of not less than 96% albumin) was used for the pretreatment of the acetyl-cellulose filter pad which solution had been previously subjected to a heat treatment during a period of 10 hours at a temperature of 60° C. The heat treated solution was clarified by filtration. 1.3 millilitres per square centimeter of the acetyl cellulose filter needed a total amount of 910 millilitres of the 4 percent human albumin solution. This volume was passed through the acetyl cellulose filter in order to saturate the inner surfaces of the filter pores. Then the filter was washed with Hank's solution (21.5 millilitres per square centimeter). The last washing gave a negative result with trichloro acetic acid. The filter prepared in this way was disconnected from the washing container and connected to a sterilized container filled with 50 litres of a poliomyelitis virus suspension of type I (strain Mahoney) which had been previously clarified by filtration through Seitz type paper filter pads No. 68. A sample was taken to verify the initial titre of the virus suspension. Then the filtration of the virus suspension through the albumin saturated acetyl cellulose filter was performed under a pressure of 1.5 atmospheres. A second sample was taken from the filtrate to determine the final titre. A comparision of the titre values gave the following results: Initial titre: 6.9 per 0.25 ml. of the virus suspension; final titre: 6.8 per 0.25 ml.; a parallel experiment gave the respective values of 6.8 and 6.5 (titre values are expressed in logs of 10 giving the dilution which shows a 50 percent cytopathogenic effect in the tissue culture titration technique).

*Example 3*

A filtration set was prepared as described in Example 1, but no treatment with a protein solution was carried out. A virus suspension of poliomyelitis virus type I (strain Mahoney) was clarified by filtration. The initial titre was determined and then 50 litres of the suspension were filtered through the acetyl cellulose filter. Again a sample was taken for determination of the final titre. The respective titres (double estimations) of the pre-filtration sample was: 6.8 and 6.9, while the titre after the filtration was: 3.0 and 2.0 per 0.25 millilitre of suspension. This difference makes obvious the important loss of antigenicity during filtration according to the common practice.

The acetyl cellulose filter used in the procedures according to the Examples 1 to 3 may be prepared in the following way:

A cellulose card board in a thickness of 0.5 mm. is immersed in a solution of 4 percent by weight acetyl cellulose in glacial acetic acid during a period of 1 hour. Then the treated card board is put into flowing water during a period of 24 hours. After this washing the card board is dried. It has a mean pore diameter of about 800 to 1200 Angstrom units.

What we claim is:

1. A method for eliminating the antigen-adsorption activity of a pore filter of the acetyl cellulose type having a mean pore diameter of about 800 to 1200 angstrom units and destined for the filtration of virus fluids comprising treating the pore filter with a human protein solution selected from the group consisting of plasma protein fraction comprising a product derived from human blood consisting of not less than 85±2.7 albumin and not more than 15±2.7 globulins other than gamma globulin by moving boundary electrophoresis and a sterile preparation of the serum albumin component of human blood, the protein content of which consists of not less than 96% albumin, in a concentration of 3% to 4%, said solution being heat treated for a period of not less than 10 hours at a temperature of 60° C., to saturate the adsorptive capacity of the inner pore surfaces of the filter with proteins of human origin, and removing all protein material not tightly absorbed to the inner pore surfaces of the filter by washing it with a protein-free physiological saline solution.

2. A method for eliminating the adsorptive activity for antigen of a pore filter of the acetyl cellulose type having a mean pore diameter of about 800 to 1200 angstrom units and destined for the filtration of virus fluids, comprising treating said pore filter with a protein solution selected from the group consisting of plasma protein fraction comprising a product derived from human blood consisting of not less than 85±2.7 albumin and not more than 15±2.7 globulins other than gamma globulin by moving boundary electrophoresis and a sterile preparation of the serum albumin component of human blood, the protein content of which consists of not less than 96% albumin, the solution containing proteins of human origin in the range of the electrophoretic mobility classes between $-8.0$ and $-3.0\times10^{-5}$ cm.$^2$ volt$^{-1}$ sec.$^{-1}$, in a concentration of 3 to 4 percent, being treated for a period of not less than 10 hours at a temperature of 60° C. and free from denaturated protein fractions, and having a turbidity of not more than 30 Mueller units, and then removing all protein material not tightly adsorbed to the inner pore surfaces of the filter by washing it with sterile Hank's solution.

3. A method as set forth in claim 2 in which such an amount of the protein solution is used for treating the pore filter that 50 to 55 mg. protein are available per square centimeter of the filter.

4. A method for the filtration of virus fluids having a given antigenicity comprising treating a pore filter of the acetyl cellulose type having a mean pore diameter of about 800 to 1200 angstrom units, being three to four times greater than the mean particle diameter of the virus to be filtrated, comprising pretreating said pore filter with a heat-inactiviated human protein solution selected from the group consisting of plasma protein fraction comprising a product derived from human blood consisting of not less than 85±2.7 albumin and not more than 15±2.7 globulins other than gamma globulin by moving boundary electrophoresis and a sterile preparation of the serum albumin component of human blood, the protein content of which consists of not less than 96% albumin, the solution having a concentration of 3 to 4 percent and being free from denaturated protein fractions, in order to saturate the adsorptive capacity of the filter pads with proteins of human origin, washing the pore filter with a protein-free physiological saline solution to remove all protein materials not tightly adsorbed to the inner surface of the pores, and passing the virus fluid through the filter, the filtrate containing all of antigenicity of the origin virus fluid.

5. A method as set forth in claim 4 in which fluids containing virus selected from poliomyelitis virus of the type I, II and III are treated.

References Cited in the file of this patent

FOREIGN PATENTS

| | | |
|---|---|---|
| 1,012,436 | Germany | July 18, 1957 |

OTHER REFERENCES

Krueger et al.: Jour. Gen. Physiol., vol. 13, pp. 409–419 (1930).

Hodes et al.: Science, vol. 125, p. 1089 (1957).

Galloway et al.: Brit. J. Exptl. Path., vol. 12, p. 407, (1931).

Clark et al.: PSEBM, vol. 31, p. 255 (1933).

Gard: World Health Organization Monograph Ser. No. 26, p. 215—end of monograph (1955).

Svedmyr et al.: PSEBM, vol. 79, p. 296 (1952).

Svedmyr et al.: Am. J. Hyg., vol. 57, p. 57 (1953).

Sobin et al.: PSEBM, vol. 85, p. 359 (1954).

Melnick, Ann. N.Y. Acad. Sci., vol. 61, p. 754 (1955).

Baumeister et al.: J. Inf. Diseases, vol. 98, p. 27 (1956).

Kabat et al.: "Experimental Immunochemistry," Chas. C. Thomas Co., Springfield, Ill. (1948), pp. 429–436.

Wiedermann et al.: "Physikalische Ultrafiltration von Serum-proteinen als Modellversuch für naturliche Ultrafiltrations prozesse," in Schweiz. Med. Wochschr., vol. 86, pp. 930–1, 1956 (in German).

Prudhomme: "L'Ultra-Filtration Fractionée," in Chimie Analytique, vol. 39, pp. 133–141, 1957 (in French).